United States Patent [19]
Nelson et al.

[11] Patent Number: 5,961,792
[45] Date of Patent: Oct. 5, 1999

[54] METHOD FOR MAKING TITANIUM OR TITANIUM-ALLOY SUBSTRATE FOR MAGNETIC-RECORDING MEDIA

[75] Inventors: Carl W. Nelson, Hayward; Richard D. Weir; Richard S. Weir, both of Agoura Hills, all of Calif.

[73] Assignee: Tulip Memory Systems, Inc., Fremont, Calif.

[21] Appl. No.: 08/844,162

[22] Filed: Apr. 18, 1997

Related U.S. Application Data

[62] Division of application No. 08/118,147, Sep. 8, 1993, Pat. No. 5,707,705.

[51] Int. Cl.$^6$ .................. C23C 14/00; C23C 14/32
[52] U.S. Cl. .................. 204/192.1; 204/192.11; 204/192.12; 204/192.16; 204/192.2; 204/192.32; 427/129; 427/130; 427/131
[58] Field of Search .................. 427/129–131; 204/192.1, 192.11, 192.12, 192.16, 192.2, 192.32

[56] References Cited

U.S. PATENT DOCUMENTS

| | | | |
|---|---|---|---|
| 3,784,402 | 1/1974 | Reedy, Jr. | 428/457 |
| 3,900,592 | 8/1975 | Kennedy et al. | 427/569 |
| 3,912,461 | 10/1975 | Wakefield | 428/579 |
| 4,226,082 | 10/1980 | Nishida | 368/285 |
| 4,743,491 | 5/1988 | Asada et al. | 428/213 |
| 4,990,362 | 2/1991 | Kibe et al. | 427/528 |
| 5,120,615 | 6/1992 | Fukai et al. | 428/694 R |
| 5,126,179 | 6/1992 | Inagaki | 428/65.6 |
| 5,131,995 | 7/1992 | Suenaga et al. | 204/192.16 |
| 5,221,459 | 6/1993 | Okano et al. | 205/322 |
| 5,707,705 | 1/1998 | Nelson . | |

FOREIGN PATENT DOCUMENTS

| | | |
|---|---|---|
| 52-105804 | 5/1977 | Japan . |
| 59-148129 | 8/1984 | Japan . |
| 61-199224 | 9/1986 | Japan . |
| 62-219322 | 9/1987 | Japan . |

OTHER PUBLICATIONS

Thorton "Influence Of Apparatus Geometry And Deposition Conditions On The Structure And Topography Of Thick Sputtered Coatings"; J. Vac. Sci. Technol., vol. II, No. 4, Jul./Aug. 1974; pp. 666–670.

Hoffman, et al. "Microstructural Control Of Plasma–Sputtered Refractory Coatings" Handbook of Plasma Processing Technology, Chapter 21; pp. 483–517. (1985).

Bell, et al. "Plasma Surface Engineering" Plasma Heat Treatment, Science and Technology, PYC Edition, Paris, France (1987); pp. 13–53.

Liu, et al. "Ion Nitriding Of Titanium And Zirconium By A dc–Glow Discharge Method" High Temperature Science 10, pp. 53–65, 1978.

Brazanza, et al. "Nitriding Of Metals And Interaction Of The Nitrides With A Low Pressure Hydrogen Plasma", Proc. 4th Int'l Symp. on Plasma Chemistry, S. Veprek & J. Hertz, Eds., Universitat, Zurich, Switzerland (1979); pp. 100–108.

Wirz, et al. "Kinetic And Crystallographic Aspects Of Nitriding Of Metals In A Low Pressure Nitrogen Plasma: Niobium And Molybdenum", Proc. 4th Int'l Sump on Plasma Chemistry, Veprek and Hertz, eds., Universitat, Zurich, Switzerland (1979); pp. 492–293.

(List continued on next page.)

*Primary Examiner*—Leszek Kiliman
*Attorney, Agent, or Firm*—Limbach & Limbach L.L.P.

[57] ABSTRACT

An improved magnetic-recording disk and a process for manufacturing magnetic-recording disks are disclosed. Precision cold-rolled titanium or titanium alloy is the substrate for a magnetic-recording disk. The surface of the substrate may be hardened by plasma nitriding, plasma carburizing, or plasma carbonitriding. A hard coating may be applied to the substrate by evaporative reactive ion plating or reactive sputtering of aluminum nitride, silicon nitride, silicon carbide, or nitrides, carbides, or borides of titanium, zirconium, hafnium, vanadium, niobium, tantalum, chromium, molybdenum, or tungsten.

22 Claims, 1 Drawing Sheet

OTHER PUBLICATIONS

Konuma, et al. "Nitriding Of Titanium In A Radio Frequency Discharge", Journal of the Less Common Metals, 52 (1977) 145–152.

Konuma, et al. "Nitriding Of Zirconium In A Radio Frequency Discharge", Journal of the Less Common Metals, 55 (1977) 97–102.

Konuma, et al. "Nitriding And Carburizing Of Metals In A Radio Frequency Discharge" Proc. 4th Int'l Symp. on Plasma Chemistry, S. Veprek & J. Hertz, eds., Universitat, Zurich, Switzerland (1979); pp. 174–179.

Matsumoto, et al. "Nitriding Of Titanium In An R.F. Discharge II: Effect Of The Addition Of Hydrogen To Nitrogen On Nitriding", Journal of the Less Common Metals, 84 (1982) pp. 157–163.

Shibutami, et al. "Nitriding Of Titanium In Microwave Discharges", Journal of the Less Common Metals, 113 (1985); pp. 177–187.

Shibutami, et al. "Nitriding Of Titanium In A Microwave Discharge II. Kinetic Study" Journal of the Less Common Metals, 120 (1986); pp. 93–99.

Konuma "Film Deposition By Plasma Techniques", Springer–Verlag, Berlin, Germany (1992) Ch. 8; pp. 185–194.

Grube, et al. "High–Rate Carburizing In A Glow–Discharge Methane Plasma", Met. Trans. A 91; vol. 9A, Oct. 1978; pp. 1421–1429.

Krauss "Steels: Heat Treatment And Processing Principles", ASM Int'l, Materials Park, Ohio (1990); pp. 319–325.

Edenhofer, et al. "Industrial Processes, Applications And Benefits Of Plasma Heat Treatment", Plasma Heat Treatment, Science & Technology, PYC Edition, Paris, France (1987); pp. 399–415.

Dexter "The Physical And Chemical Processes Of Vacuum And Glow Discharge Carburising" Plasma Heat Treatment, Science & Technology, PYC Edition, Paris, France (1987); pp. 58–71.

Korhonen, et al. "Plasma Nitriding And Ion Plating With An Intensified Glow Discharge" Thin Solid Films, 107 (1983); pp. 387–394.

METHOD FOR MAKING TITANIUM OR TITANIUM-ALLOY SUBSTRATE FOR MAGNETIC-RECORDING MEDIA

This is a divisional of application Ser. No. 08/118,147, filed Sep. 8, 1993 now U.S. Pat. No. 5,707,705.

BACKGROUND OF THE INVENTION

1. Field of the Invention

This invention relates generally to magnetic-recording disks, and relates more particularly to a titanium or titanium-alloy substrate for application of magnetic-recording media.

2. Description of the Relevant Art

In a disk file, the most common recording medium is a very flat and smooth aluminum-alloy substrate disk having both of its surfaces coated with a magnetic-recording material such as a ferrimagnetic or ferromagnetic oxide powder dispersed in a resin binder or a plated or sputter-deposited thin film of ferromagnetic cobalt alloy.

Typically, an aluminum-alloy substrate of a magnetic-recording disk has surfaces that are either diamond tool turned on a lathe or ground by a surface grinder. These machined surfaces result in matte finishes. Alternatively, substrate disks may be precision blanked from flat precision cold-rolled aluminum-alloy sheet or other metal strip whose surface finish would replicate that of the work rolls used in the finishing-pass of the rolling mill. For example, with work rolls that have been ground and polished to a mirror-bright finish, a metal strip with a mirror-bright surface finish would result.

Aluminum is a soft metal and, therefore, can be damaged by a read/write head impacting the disk too forcefully. To provide for protection against defects caused by impacts of a read/write head, an aluminum-alloy substrate is typically first coated with a hard, nonmagnetic material before the magnetic-recording material is applied. A nickel-phosphorus alloy, electroless-deposited from an aqueous solution, is the hard material commonly used for this application. In order for this protective plating to adhere properly to the surface of an aluminum-alloy substrate, a zincate solution is used to dissolve the surface aluminum oxides, hydroxyoxides, and hydrous oxides, and to provide a zinc metal layer by replacement reaction. After coating, the surface of the nickel-phosphorus-alloy-coated disk is extensively lapped and polished to provide a flat and smooth surface for the application of the magnetic layer. This lapping and polishing step is expensive and adds substantial costs to the final disk product.

Apart from the need to lap and polish the disk after application of the nickel-phosphorus alloy, the application of this hard coating presents additional difficulties. For example, it is extremely difficult to obtain flaw-free electroless-deposited nickel-phosphorus-alloy coatings. Nodules, pits, and bumps occur in these coatings and such defects cause recording errors.

Another problem is that the electroless-deposited nickel-phosphorus alloy is very prone to recrystallization upon heating, where the nonmagnetic (actually, superparamagnetic) single phase of nickel and phosphorus separates into two equilibrium crystalline phases, namely, nickel, which is ferromagnetic, and nickel phosphide. The resulting ferromagnetism renders the media useless for the magnetic-recording application.

Moreover, such a disk is also subject to warpage upon heating because of stress concentrations at the coating-substrate interface. This warpage also renders the media useless.

Another problem associated with the use of an aluminum alloy as a substrate is the added cost for time and labor involved in its processing. Furthermore, entire disks can be rendered useless through myriad heat-related effects.

SUMMARY OF THE INVENTION

In accordance with the illustrated preferred embodiment, the present invention provides an improved magnetic-recording disk and a process for manufacturing magnetic-recording disks. A hard, flat disk of titanium or titanium-alloy is the substrate for a magnetic-recording disk. Conventional magnetic-recording materials may be applied to the surfaces of the titanium or titanium-alloy disk substrate either directly or after first surface-hardening or hard-coating the substrate.

One aspect of the present invention is to provide a substrate precision blanked from flat precision cold-rolled titanium or titanium-alloy strip.

Another aspect of the present invention is to harden the surface region of the titanium or titanium-alloy substrate by a hardening treatment prior to application of the magnetic-coating material. The process used for the hardening treatment can be plasma nitriding, plasma carburizing, or plasma carbonitriding.

Yet another aspect of the present invention is to apply a hard coating to the surface of the titanium or titanium-alloy substrate as an alternative to or in addition to the surface-hardening treatment. The application of the hard coating is done by evaporative reactive ion plating or reactive sputtering of a hard material selected from the group consisting of aluminum nitride, silicon nitride, silicon carbide, and nitrides, carbides, and borides of titanium, zirconium, hafnium, vanadium, niobium, tantalum, chromium, molybdenum, or tungsten.

A significant advantage of the present invention is that it provides a flat, hard substrate for the deposition of magnetic-recording materials. The present invention reduces the costs involved in the manufacture of magnetic-recording disks in both materials costs and waste costs by eliminating the deposition of nickel-phosphorus alloy.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

Figure 1:
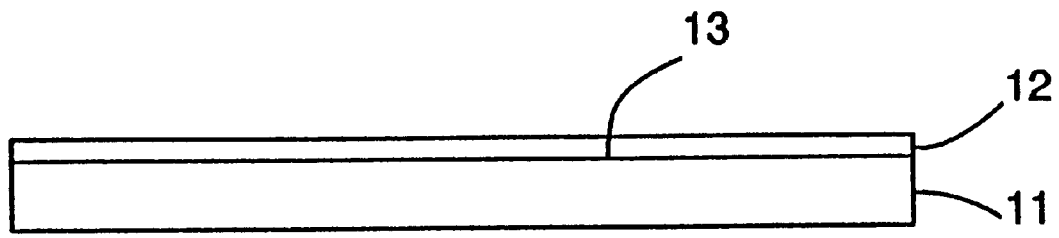
FIG. 1 is a side view of a titanium or titanium-alloy substrate of the present invention with a layer of magnetic-recording media applied directly to the substrate, with or without a prior surface hardening of the substrate. This and other figures herein are not to scale.
Figure 2:
FIG. 2 is a side view of a titanium or titanium-alloy substrate of the present invention with a hard coating applied to the substrate prior to deposition of a layer of magnetic-recording media.

FIGS. 1 and 2 of the drawings and the following description depict various preferred embodiments of the present invention for purposes of illustration only. One skilled in the art will readily recognize from the following discussion that alternative embodiments of the structures and methods illustrated herein may be employed without departing from the principles of the invention described herein. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the claims.

The present invention provides low-cost, high-performance substrates for magnetic-recording applications by providing a substrate disk from a precision-rolled strip of titanium or titanium alloy. Accordingly, the present invention obviates the need for the costly and troublesome electroless-deposited nickel-phosphorus-alloy coating, which is otherwise required on an aluminum-alloy disk substrate.

Since the surface finish of the precision-rolled strip becomes a contact negative of the work-roll finish used in the final pass of the mill, the smoother the surface finish of the final-pass work rolls, the smaller is the amount of lapping and polishing required for the substrate disk. Subsequently, both surfaces of the titanium or titanium-alloy substrate disk can be appropriately textured to give a circumferential scratch pattern. This intentional surface roughening serves simultaneously two desirable purposes: 1) tribologically, to minimize stiction and friction at the head-to-disk interface; and 2) on the subsequently sputter-deposited films of the chromium (or chromium-alloy) underlayer and the cobalt-alloy magnetic layer, to provide preferred orientation of the crystallites along the circumferential texture lines in the substrate plane. For the case of the application of a hard coating prior to the deposition of the magnetic media, the texturing of the disk substrate surfaces by the abrasive tape or slurry should be more severe (the peak-to-valley heights greater) than ordinarily in order to compensate for the extraordinary levelizing effect obtained in coatings characteristic of the energetic-atom-deposited dense fibrous Zone T structure (as shown on the Movchan-Demchishin-Thornton zone-structure diagram) where the energy involved per depositing atom is sufficiently high. References on the subject of coating zone structures include the following: J. A. Thornton, J. Vac. Sci. Technol. 11, 666 (1974); D. W. Hoffman and R. C. McCune in "Handbook of Plasma Processing Technology", S. M. Rossnagel, J. J. Cuomo, and W. D. Westwood, eds., Ch. 21, pp. 483–517, Noyes Publications, Park Ridge, N.J. (1990).

As shown in FIG. 1, onto a properly surface-finished substrate disk 11 made of a titanium or titanium alloy, a coating of magnetic-recording media 12, composed of chromium (or chromium alloy) and cobalt-alloy double-layer thin films, is directly applied by sputter deposition. While the magnetic-recording media 12 is shown applied to only one surface of the disk substrate 11, of course it is conventional and within the scope of the present invention to coat both surfaces of the substrate with magnetic-recording media. FIG. 1 and the rest of the figures herein are not to scale.

The surface region 13 of the titanium or titanium-alloy substrate 11 can be modified to the depth of several micrometers (as much as 100 $\mu$m) by a hardening treatment prior to the deposition of the magnetic-recording media 12. The hardening treatment is preferably either plasma nitriding, plasma carburizing, or plasma carbonitriding.

The plasma surface-hardening treatment of the titanium or titanium-alloy disk substrates can be accomplished in the same system designed for evaporative ion plating and described in U.S. patent application Ser. No. 07/771,348, filed Oct. 4, 1991 now U.S. Pat. No. 5,811,182 by the instant inventors, which disclosure is hereby incorporated by reference. This system contains an electrically isolated cantilevered drum planetary substrate holder in which six equispaced planet gears, each with its cantilevered shaft, rotate around a nonrotating sun gear, causing the drum housing to also rotate around the sun gear. The disk substrates through the inside diameter are mounted on (and in electrical contact with) the cantilevered shafts so that they are equispaced along each shaft length. In this way both sides of the disk substrates are simultaneously exposed to the gas discharge. Since the drum planetary and the disk substrates when powered are all at the same bias potential, a quasi-hollow cathode is formed by each facing pair of disk substrates. This multi-quasi-hollow-cathode configuration, when high-radiofrequency powered, results in a gas discharge of high plasma density permitting, for a given power density, substantially higher bombarding-ion current densities and lower voltages to be obtained at low pressures in comparison with the well-known simple high-radiofrequency-powered-planar-disk-diode configuration.

In the plasma nitriding of titanium and titanium alloys, energetic nitrogen atoms (some of which had been energetic nitrogen ions) from the dissociation of nitrogen molecules in the gas discharge adsorb on the sputter-etch-cleaned surface, diffuse inward at temperatures of 350° to 850° C., and hardening is accomplished by the precipitation of very-fine interstitial alloy nitride grains in the diffusion zone. The nitrogen content decreases gradually through the depth of the diffusion zone. Deepest into the diffusion zone, the nitrogen atoms are in interstitial solid solution with the hexagonal-close-packed or body-centered-cubic phases of titanium or titanium alloy. Since the titanium nitride phase with its double-interpenetrating-face-centered-cubic structure has a very wide range of stoichiometry, this phase forms nearer the surface but remains nitrogen-deficient until reaching the surface, where it becomes near-stoichiometric or stoichiometric.

Prior to beginning the plasma surface-hardening treatment, the disk substrates (along with the planetary substrate holder) are sputter-etch cleaned by means of, first, an air gas discharge operated anywhere in the pressure range of 40 Pa (300 mtorr) to 400 Pa (3.0 torr) and at a developed dc bias voltage whose magnitude is less than −30 V, measured with respect to ground, from the high-radiofrequency (13.56 MHz) power coupled to the planetary. The air glow-discharge cleaning selectively and rapidly removes carbonaceous substances and organic contaminants such as oils, greases, and waxes by converting them into volatile gases ($CO$, $CO_2$, and $H_2O$) which are pumped away. Furthermore, this air gas discharge provides an extremely effective method for efficiently heating the disk substrates by means of the heat input delivered not only by the low-voltage bombarding ions but also by the surface recombination of energetic excited neutral atoms to form molecules. If desired, a gas mixture of oxygen and nitrogen can be used instead of air.

The oxides on the disk substrate surfaces are sputter-etched away and dissociated by means of energetic atom and ion bombardment by hydrogen and argon atoms and ions from a hydrogen-argon discharge operated anywhere in the pressure range of 40 Pa (300 mtorr) to 400 Pa (3.0 torr) and at a developed dc bias voltage whose magnitude is greater than −30 V, measured with respect to ground, from the 13.56 MHz rf power coupled to the planetary. Interestingly, if triode assistance in the form of thermionic hot-tungsten-filament cathodes is provided in this process, for a given negative dc bias voltage (typically −20 V) on the filament array and a given 13.56 MHz rf power coupled to the planetary, the magnitude of the developed dc bias voltage (ad hence the bombarding-ion energy) on the planetary and its substrates can be increased by increasing the amount of thermionically emitted electrons. [Electron emission is controlled by adjusting the temperature of the filament with more electrons being emitted by increasing the 50 or 60 Hz ac heating current through the filament.] This behavior observed over the pressure range of 40 Pa (300 mtorr) to 400 Pa (3.0 torr) is opposite to that of the normal triode sputtering source operated over the pressure range of 0.1 Pa (0.75 mtorr) to 2 Pa (15 mtorr). Furthermore, the filament array depending on its proximity to the disk substrates can provide heating of these substrates in addition to that delivered from the energetic ion bombardment by both argon and hydrogen ions and from the surface recombination of energetic excited hydrogen atoms to form hydrogen molecules.

After sufficient time has elapsed to free the disk substrate surfaces of oxides and to sufficiently heat the substrates, nitrogen is introduced to the gas discharge. Various gases or gas-mixture combinations can be used as follows: (1) nitrogen and hydrogen; (2) nitrogen, hydrogen, and argon; (3) ammonia; (4) ammonia and argon. Since the former two discharges generate ammonia, and the latter two discharges generate nitrogen and hydrogen, they are essentially equivalent in effect. The plasma-nitriding surface-hardening treatment of the substrates can take place anywhere in the pressure range of 40 Pa (300 mtorr) to 400 Pa (3.0 torr). Alternatively, if triode assistance as described above is provided, then pressures as low as 1.0 Pa (7.5 mtorr) to 4.0 Pa (30 mtorr) can be employed.

In an analogous way, the plasma-carburizing surface-hardening treatment of the substrates can be accomplished with the substitution of a hydrocarbon gas, such as methane, for nitrogen or ammonia. For the case of plasma carbonitriding, then a hydrocarbon gas, such as methane, is added to the nitrogen- or ammonia-containing gas mixture.

Since carbonaceous substances and surface oxides on the substrates act as diffusion barriers to the energetic nitrogen and carbon atoms adsorbed from the glow-discharge plasma nitriding, carburizing, or carbonitriding process, it is essential that glow-discharge sputter-etch cleaning of the substrates and sputter-etch removal of the surface oxides take place prior to the plasma surface-hardening treatment. The plasma, in the presence of a nitriding or carburizing gas, increases the mass transfer of nitrogen or carbon atoms, respectively, to the substrate surface in comparison with conventional gas nitriding or carburizing methods. Case depth is still largely controlled by solid-state diffusion of nitrogen and/or carbon atoms in the titanium or titanium alloy to form fine-grain precipitates of interstitial nitrogen-containing, carbon-containing, or nitrogen- and carbon-containing alloys, and of nitride, carbide, or carbonitride phases, correspondingly, a time-temperature-dependent process which proceeds independently of the plasma.

References on the subject of plasma nitriding, plasma carburizing, and plasma carbonitriding include the following:

T. Bell and P. A. Dearnley, "Plasma Surface Engineering" in "Plasma Heat Treatment, Science and Technology", PYC Edition, Paris, France (1987), pp. 13–53.

M.-B. Liu, D. M. Gruen, A. R. Krauss, A. H. Reis, Jr., and S. W. Peterson, High Temp. Sci. 10, 53 (1978).

C. Braganza, S. Veprek, E. Wirz, H. Stussi, and M. Textor, Proc. 4th Int'l Symp. on Plasma Chemistry, S. Veprek and J. Hertz, eds., Universitat, Zurich, Switzerland (1979), p. 100.

E. Wirz, H. R. Oswald, and S. Veprek, Proc. 4th Int'l Symp on Plasma Chemistry, S. Veprek and J. Hertz, eds., Universitat, Zurich, Switzerland (1979), p. 492.

M. Konuma and O. Matsumoto, J. Less-Common Met. 52, 145 (1977).

M. Konuma and O. Matsumoto, J. Less-Common Met. A, 97 (1977).

M. Konuma, Y. Kanzaki, and O. Matsumoto, Proc. 4th Int'l Symp. on Plasma Chemistry, S. Veprek and J. Hertz, eds., Universitat, Zurich, Switzerland (1979), p. 179.

O. Matsumoto, M. Konuma, and Y. Kanzaki, J. Less-Common Met. 84, 157 (1982).

T. Shibutami, Y. Kanzaki, and O. Matsumoto, J. Less-Common Met. 113, 177 (1985).

T. Shibutami and O. Matsumoto, J. Less-Common Met. 120, 93 (1986).

M. Konuma, "Film Deposition by Plasma Techniques", Springer-Verlag, Berlin, Germany (1992), Ch. 8, pp. 185–194.

As shown in FIG. 2, a 0.5 to 1.0 $\mu$m thickness, or other appropriate thickness, layer 14 of a hard coating may be applied prior to the deposition of the magnetic-recording media 12. The hard coating is selected from the group consisting of aluminum nitride, silicon nitride, silicon carbide, and nitrides, carbides, and borides of titanium, zirconium, hafnium, vanadium, niobium, tantalum, chromium, molybdenum, or tungsten, and can be directly deposited on the titanium or titanium-alloy substrate 11 by evaporative reactive ion plating or by reactive sputtering. Such a hard coating has been disclosed in U.S. patent application Ser. No. 07/771,348, filed Oct. 4, 1991 now U.S. Pat. No. 5,811,182 by the instant inventors, which disclosure is hereby incorporated by reference. Preferably, the magnetic-recording media 12 is comprised of chromium (or chromium-alloy) and cobalt-alloy thin-film layers.

In addition, the surface region 13 of the titanium or titanium-alloy substrate 11 can be hardened to the depth of several micrometers (as much as 100 $\mu$m) by plasma nitriding, plasma carburizing, or plasma carbonitriding, and then a 0.5 to 1.0 $\mu$m thickness, or other appropriate thickness, layer of a hard coating selected from the group consisting of aluminum nitride, silicon nitride, silicon carbide, and nitrides, carbides, and borides of titanium, zirconium, hafnium, vanadium, niobium, tantalum, chromium, molybdenum, or tungsten can be deposited on this hardened surface of this titanium or titanium-alloy substrate by evaporative reactive-ion plating or by reactive sputtering prior to the sputter deposition of the magnetic-recording media 12.

The high strengths and low densities of titanium and titanium alloys result in exceptionally favorable strength-to-density ratios. Titanium with its alloys bridges the design gap between aluminum alloys and steels, particularly the austenitic stainless steels, offering a combination of many of the most desirable properties of each. The corrosion resistance of titanium and its alloys is on par with the best of the austenitic stainless steels. In the passive state each group has an equivalent position in the electromotive series at the cathodic end just above silver and graphite, making these groups among the most corrosion-resistant of metals. On the other hand, aluminum and aluminum alloys are near the top of this series at the anodic end, making them very reactive in comparison.

For disk substrates, the most cost-effective choice among titanium alloys is Ti-3Al-2.5V (ASTM Grade 9)(UNS R56320), corresponding in atom percent to 92.5Ti-5.2Al-2.3V. This alloy possesses high strength and ductility in the annealed condition. Further increases in strength occur with cold work resulting in only a small decrease in ductility and formability, e.g., by the cold-reduction rolling-mill operation. This cold reduction is preferably followed by a stress-relieve heat treatment at 540° C. in an argon atmosphere or in vacuum to protect the metal from penetration and hence embrittlement by reactive gases.

The 5086 aluminum-magnesium alloy (UNS A95086) is very widely used for disk substrates by the magnetic-recording industry. A comparison chart (Table 1, below) for some physical and mechanical properties of the 5086 aluminum alloy (UNS A95086) and the high-strength titanium alloy Ti-3Al-2.5V (ASTM Grade 9) (UNS R56320) shows that, with the exception of density, the latter has all the remaining advantages over the former (Table 2, below). More significantly, with these two materials each in the annealed condition, the ultimate tensile strength-to-density ratio of the titanium alloy is 1.49 times that of the aluminum alloy, and the yield strength-to-density ratio of the titanium alloy is 2.83 times that of the aluminum alloy. In the 20%-cold-worked and stress-relieved condition for the titanium alloy and the 20%-cold-worked condition for the aluminum alloy, the ultimate tensile strength-to-density ratio of the titanium alloy is 1.87 times that of the aluminum alloy, and the yield strength-to-density ratio of the titanium alloy is 2.30 times that of the aluminum alloy (cf. Tables 2 and 3, below). The melting point of the titanium alloy is 1700° C., and the melting point range of the aluminum alloy is 585° to 640° C. Consequently, the heat-distortion resistance is considerably higher for the titanium alloy than for the aluminum alloy.

TABLE 1

Comparison of some physical and mechanical properties of 5086 aluminum alloy (UNS A95086) and Ti-3Al-2.5 V (ASTM Grade 9) (UNS R56320) titanium alloy

| | Aluminum alloy 5086 | Titanium alloy Ti-3Al-2.5 V |
|---|---|---|
| Density | 2.66 g/cm$^3$ | 4.48 g/cm$^3$ |
| Electrical resistivity | 5.48 microohm cm | 126 microohm cm |
| Thermal-expansion coefficient | | |
| (20 to 100° C.) | 23.8 × 10$^{-6}$ cm/cm° C. | 9.5 × 10$^{-6}$ cm/cm° C. |
| (0 to 650° C.) | | 9.9 × 10$^{-6}$ cm/cm° C. |
| Melting point range | 585° to 640° C. | 1700° C. |
| Modulus of elasticity (Young's) | 10,300 kpsi 71 GPa | 15,000 kpsi 103 GPa |
| Ultimate tensile strength | | |
| annealed | 38,000 psi 262 MPa | 95,000 psi 655 MPa |
| 20% work hardened | 42,000 psi 290 MPa | 132,000 psi 910 MPa |
| 40% work hardened | 47,000 psi 324 MPa | |
| Yield strength 0.2% | | |
| annealed | 17,000 psi 117 MPa | 81,000 psi 558 MPa |

TABLE 1-continued

Comparison of some physical and mechanical properties of 5086 aluminum alloy (UNS A95086) and Ti-3Al-2.5 V (ASTM Grade 9) (UNS R56320) titanium alloy

| | Aluminum alloy 5086 | Titanium alloy Ti-3Al-2.5 V |
|---|---|---|
| 20% work hardened | 30,000 psi 207 MPa | 116,000 psi 800 MPa |
| 40% work hardened | 37,000 psi 255 MPa | |

TABLE 2

Ratio property comparison of Ti-3Al-2.5 V (ASTM Grade 9) (UNS R56320) titanium alloy to 5086 aluminum alloy (UNS A95086)

| Density | 1.68 times |
|---|---|
| Electrical resistivity | 22.99 times |
| Thermal-expansion coefficient | |
| (20 to 100° C.) | 0.40 times |
| Modulus of elasticity (Young's) | 1.46 times |
| Ultimate tensile strength | |
| annealed condition | 2.50 times |
| 20% work hardened | 3.14 times |
| Yield strength 0.2% | |
| annealed condition | 4.76 times |
| 20% work hardened | 3.87 times |

TABLE 3

Ratio of the strength-to-density ratio of Ti-3Al-2.5 V (ASTM Grade 9) titanium alloy (UNS R56320) with respect to the strength-to-density ratio of 5086 aluminum alloy (UNS A95086) for each of the following conditions

| Annealed condition | |
|---|---|
| ultimate tensile strength | 1.49 times |
| yield strength 0.2% | 2.83 times |
| 20%-Cold-worked condition | |
| ultimate tensile strength | 1.87 times |
| yield strength 0.2% | 2.30 times |

Where now a 0.050 inch-thickness disk substrate [95 mm (3.740 inch) diameter] of the 5086 aluminum alloy (UNS A95086) is used, a 0.030 inch-thickness disk substrate of the Ti-3Al-2.5V (ASTM Grade 9) titanium alloy (UNS R56320), with its advantage of high strength-to-density ratio, could be used instead, resulting in the same weight for the disk substrate but a significantly reduced thickness.

Titanium or titanium-alloy strip over the thickness range required for disk substrates can be precision cold rolled to a tolerance of better than ±0.0001 inch (±0.0025 mm) on modern (or modernized) Sendzimer Type 1-2-3-4 twenty-high roll-cluster mills. In this mill, the two work rolls have the smallest practical diameter, each of which is backed by two intermediate rolls, and each of these pairs is backed by three larger-diameter rolls, where in turn each set is backed by four high-capacity bearing assemblies, all mounted in a rugged one-piece cast housing. The extreme rigidity and supporting structure of this mill arrangement minimizes work-roll deflection in the horizontal plane as well as bending in the vertical plane. The small-diameter work rolls in the reversing mill permit at high speeds the greatest overall (i.e., with a few passes back and forth) thickness reductions between anneals, easily by 40% with up to 75% being possible. Strip of extremely close thickness tolerance both across the width and along the length is possible with a Sendzimer mill when equipped with an automatic anticipatory gauge-control system which continuously electronically scans and compares the entry and exit strip across the width, and which signals a servomechanism controlling the electro-hydraulic screwdown positioning system for adjusting the mill cluster rolls. A computer controlling these systems also controls a tensiometer-mechanism system to provide constant winder tension and a motor-drive system to provide constant mill speed, plus other compensating adjustment systems. For the finishing pass of the strip in a reversing mill, the easily removable work rolls may be exchanged for ones that are highly polished to a mirror finish. In this way a strip product with a mirror-bright surface finish down to less than one microinch can be obtained. Furthermore, a precision rolling mill can be equipped with an inline tension leveler combining stretcher and roller leveling in a single operation to literally stretch the metal strip to ultraflatness.

A method of fabricating the disk substrate from the titanium or titanium-alloy strip is chosen that will not distort and deform the part in cutting the disk outside and inside diameters. Conventional stamping of metals entailing a blanking, punching, and shearing operation typically does not provide the required precision for magnetic-recording disks. The required precision can be met by a forming operation known as precision blanking, and similarly fineblanking, wherein a high-speed hydraulic punch press, with very little clearance between the punch and die (less than one-half percent of the piece-part material thickness) and having a dull punch tool edge instead of the usual-sharp one, is employed. The part, being clamped and confined within the die cavity, is cold extruded out of the strip instead of sheared and fractured away. The resulting parts have smooth straight sides with no taper or die break.

Alternatively, an electromagnetic-driven very-high-velocity impact punch press, with a precision die set having near-zero clearance between the punch and die, can blank parts with smooth straight sides and with sharp burr-free edges and without any die roll. In the usual punching operation, the workpiece undergoes three stages: elastic, plastic, and fracture. Very-high-velocity impact punch pressing bypasses the elastic and plastic stages and causes the fracture stage to take place so rapidly that the metal workpiece does not have time to react, and rolled edges and burrs do not have time to form. This electromagnetic-driven very-high-velocity impact punch press has been designed at Lourdes Systems, Inc., Hauppauge, Long Island, N.Y.

Marring of the surface finish on the precision-rolled strip caused from the contact by the punch tool and die cavity can be prevented by the use of a strippable plastic coating or adhesive-backed paper on the strip.

These precision blanking procedures are the least-expensive fabrication methods for cutting the disk substrates from precision-rolled strip. Computer-numerical-controlled laser machining to perform the task of precision cutting to finished dimension can also be utilized. Alternatively, abrasive water-jet cutting with the very recent improvement in its precision can be employed.

Furthermore, titanium and titanium alloys are somewhat difficult materials to deal with by conventional metalworking methods. The disk substrates blanked or cut from precision cold-rolled strip would require a very minimal lapping step, the smoother the surface finish the smaller the amount of lapping, and a finishing polishing step. In lapping and polishing behavior, titanium alloys are much like stainless steels in that the same techniques, abrasive slurries, and polishing pads can be used and with somewhat more time being required for the former as compared to the latter. A double-sided planetary lapping and polishing machine is the preferred approach for this operation.

From the above description, it will be apparent that the invention disclosed herein provides a novel and advantageous magnetic-recording substrate composed of titanium or titanium alloy. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for manufacturing a magnetic-recording disk, comprising the steps of:

preparing a disk-shaped substrate composed of titanium or a titanium alloy; and then sputter etch cleaning a surface of the substrate; and then hardening the sputter-etch-cleaned surface of the substrate by plasma nitriding, plasma carburizing, or plasma carbonitriding; and then coating a surface of the substrate with a magnetic-recording material.

2. A method for manufacturing a magnetic-recording disk as recited in claim 1 wherein the step of coating the substrate is performed by sputter deposition.

3. A method for manufacturing a magnetic-recording disk as recited in claim 1 wherein the substrate is UNS R56320 titanium alloy.

4. A method for manufacturing a magnetic-recording disk as recited in claim 1 further comprising a step of coating a surface of the substrate with a layer of a hard material selected from the group consisting of aluminum nitride, silicon nitride, silicon carbide, and nitrides, carbides, and borides of titanium, zirconium, hafnium, vanadium, niobium, tantalum, chromium, molybdenum, or tungsten, wherein said further step is performed prior to the step of coating a surface of the substrate with a magnetic-recording material.

5. A method for manufacturing a magnetic-recording disk as recited in claim 4 wherein the step of coating the substrate with a hard material is performed by evaporative reactive ion plating or reactive sputtering.

6. A method for manufacturing a magnetic-recording disk, comprising the steps of:

preparing a disk-shaped substrate composed of titanium or a titanium alloy; and then sputter etch cleaning a surface of the substrate: and then hardening the surface of the substrate by plasma nitriding, plasma carburizing, or plasma carbonitriding; and then coating the hardened surface of the substrate with a layer of a hard material selected from the group consisting of aluminum nitride, silicon nitride, silicon carbide, and nitrides, carbides, and borides of titanium, zirconium, hafnium, vanadium, niobium, tantalum, chromium, molybdenum, or tungsten by a process of evaporative reactive ion plating or reactive sputtering; and then sputter depositing a layer of magnetic-recording material on the hardened surface of the substrate.

7. A method for manufacturing a magnetic-recording disk as recited in claim 6 wherein the substrate is UNS R56320 titanium alloy.

8. A method for manufacturing a magnetic-recording disk, comprising the steps of:

providing a disk-shaped substrate composed of titanium or a titanium alloy, wherein the substrate has a surface;

sputter etch cleaning the surface of the substrate;

hardening the surface of the substrate by plasma nitriding, plasma carburizing, or plasma carbonitriding; and coating the hardened surface of the substrate with a magnetic-recording material.

9. A method as recited in claim 8 wherein the coating of magnetic-recording material is applied by sputter deposition.

10. A method as recited in claim 8 wherein the substrate is precision blanked from flat precision cold-rolled titanium or a titanium alloy.

11. A method as recited in claim 8 wherein the substrate is a titanium alloy comprising Ti, 3% Al, and 2.5% V.

12. A method as recited in claim 8 further including a step of applying a hard material coating on the hardened surface of the substrate, wherein the hard material coating is aluminum nitride, silicon nitride, silicon carbide, or a nitride, carbide, or boride of a metal selected from the group consisting of titanium, zirconium, hafnium, vanadium, niobium, tantalum, chromium, molybdenum, and tungsten, and is applied prior to the application of the magnetic-recording material.

13. A method as recited in claim 12 wherein the hard material coating has a thickness of at least 0.5 micrometers.

14. A method as recited in claim 12 wherein the hard material coating is applied by evaporative reactive ion plating or reactive sputtering.

15. A method as recited in claim 8 wherein the step of sputter etch cleaning is performed in an air gas discharge and with a developed dc bias voltage on the substrate.

16. A method for manufacturing a magnetic-recording disk, comprising the steps of:

providing a disk-shaped substrate composed of titanium or a titanium alloy, wherein the substrate has a surface;

applying a hard-material coating to the surface of the substrate, wherein the hard-material applied coating is aluminum nitride, silicon nitride, silicon carbide, or a nitride, carbide, or boride of a metal selected from the group consisting of titanium, zirconium, hafnium, vanadium, niobium, tantalum, chromium, molybdenum, and tungsten, wherein the hard-material applied coating has a thickness of at least 0.5 micrometers; and applying a coating of a magnetic-recording material overlying the hard-material applied coating.

17. A method as recited in claim 16 wherein the coating of magnetic-recording material is applied by sputter deposition.

18. A method as recited in claim 16 wherein the substrate is precision blanked from flat precision cold-rolled titanium or a titanium alloy.

19. A method as recited in claim 16 wherein the substrate is a titanium alloy comprising Ti, 3% Al, and 2.5% V.

20. A method as recited in claim 16 further comprising a step of sputter etch cleaning the surface of the substrate followed by a step of hardening the surface of the substrate by plasma nitriding, plasma carburizing, or plasma carbonitriding, wherein both additional steps occur prior to the step of applying the hard-material coating.

21. A method as recited in claim 20 wherein the step of sputter etch cleaning is performed in an air gas discharge and with a developed dc bias voltage on the substrate.

22. A method as recited in claim 16 wherein the hard material coating is applied by evaporative reactive ion plating or reactive sputtering.

* * * * *